United States Patent [19]

Ross

[11] 3,877,553

[45] Apr. 15, 1975

[54] ELECTRIC POWER DISTRIBUTION SYSTEM WITH POWER PICK-UP CARRIAGE

[75] Inventor: Donald R. Ross, Pittsburgh, Pa.

[73] Assignee: U-S Safety Trolley Corporation, Pittsburgh, Pa.

[22] Filed: Dec. 14, 1973

[21] Appl. No.: 424,655

[52] U.S. Cl.................... 191/49; 191/45 R; 191/48
[51] Int. Cl.............................................. B60l 5/38
[58] Field of Search............. 191/45, 46, 47, 48, 49, 191/50, 59

[56] References Cited
UNITED STATES PATENTS

| | | | |
|---|---|---|---|
| 2,586,414 | 2/1952 | Barkis................................. | 191/59 |
| 3,345,471 | 10/1967 | Kilburg............................. | 191/45 R |

*Primary Examiner*—M. Henson Wood, Jr.
*Assistant Examiner*—D. W. Keen
*Attorney, Agent, or Firm*—Brown, Murray, Flick & Peckham

[57] ABSTRACT

A hollow overhead rail contains parallel electrical conductors extending lengthwise thereof and having exposed lower surfaces. An electric power pick-up carriage has a channel-like frame with a bottom wall below the rail and a pair of laterally spaced side walls extending upwardly beside the opposite sides of the rail where they are supported by two rows of wheels running on the rail. Disposed in the frame is a removable insulating housing, the upper part of which has upwardly opening sockets containing electric contact members that are slidable vertical therein and pressed up against the conductors by springs. Flexible wires in the housing connect the contact members with terminals fastened to the housing and connected in turn with an electrical conductor that extends down through an opening in the bottom of the frame.

5 Claims, 4 Drawing Figures

ELECTRIC POWER DISTRIBUTION SYSTEM WITH POWER PICK-UP CARRIAGE

In my copending patent application Ser. No. 338,996, filed Mar. 7, 1973, now U.S. Pat. No. 3,801,751 a rail that supports metal conductor bars is made of a plastic that has a greater coefficient of thermal expansion than the conductors. The rail is formed from a number of sections disposed end to end with gaps between them to allow for expansion, but the conductor bars in each rail section are rigidly connected to the bars in the adjacent sections. A power pick-up carriage also is shown in the copending application. This carriage is suspended by wheels from the rail, along which it can move. However, if during cold weather the gaps between the rail sections open up too far, the leading wheels of the carriage may drop down in a gap and not cross it, thereby preventing the carriage from moving along the rail.

It is among the objects of this invention to provide an electric power distribution system similar to the one in my copending patent application but with an improved power pick-up carriage which will pass smoothly over wide gaps in the rail, and which includes improved means for supporting the contact members that engage the conductor bars and for quickly and easily electrically connecting the contact members with an electric conductor suspended from the carriage.

The preferred embodiment of the invention is illustrated in the accompanying drawings, in which FIG. 1 is a fragmentary side view;

Figure 1:
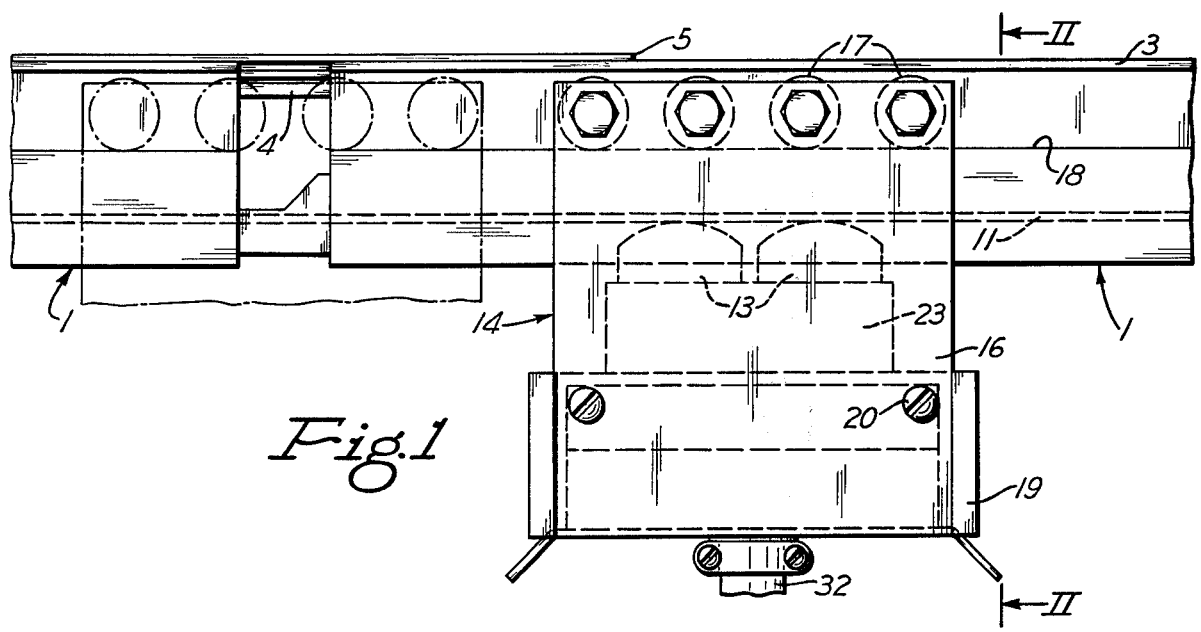
Figure 2:
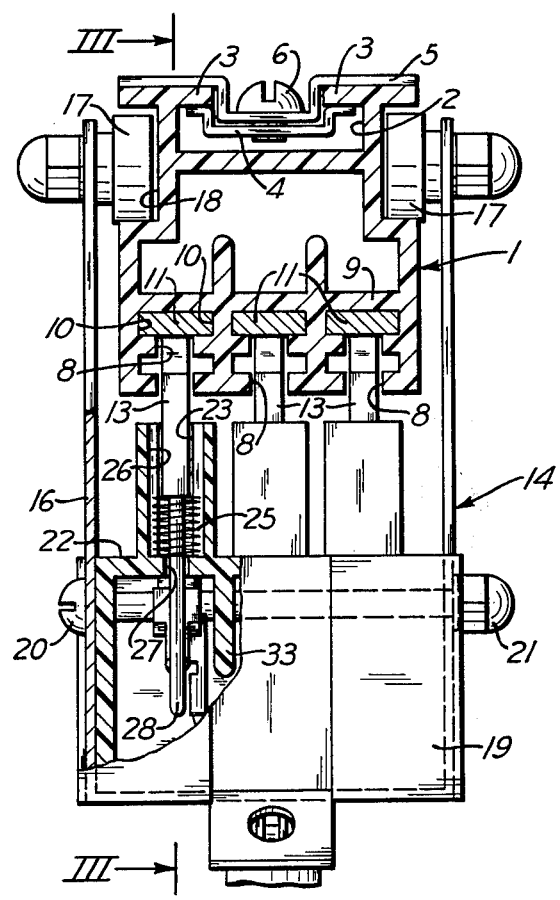
FIG. 2 is an enlarged vertical cross section taken on the line II—II of FIG. 1.

Referring to FIGS. 1 and 2 of the drawings, a rail is formed from any desired number of rigid rail sections 1, usually 10 to 20 feet long, extruded from a suitable plastic. High impact polyvinyl chloride is satisfactory. Each rail section preferably has a generally rectangular outline in cross section and may be tubular to reduce its weight, to provide a duct for wires and liquid conduits, and for other purposes. The rail sections are connected end to end, but normally gaps are left at the joints to accommodate thermal expansion. The top of the rail is provided with a channel 2 (FIG. 2) extending lengthwise of it. The outer edges of the side walls of the channel have flanges 3 extending toward each other a short distance. The channels 2 aid in connecting the rail sections end to end. For this purpose as shown in FIGS. 1 and 2, a rectangular plate 4 is slid into one end of a rail channel and then the adjacent end of the next rail section is moved up near the end of the first section. The plate is moved back into the channel of the second section until it straddles the joint between the adjacent ends of the two rail sections. Another plate 5 is placed on top of flanges 3, and screws 6 that are rotatably mounted in this plate are screwed into threaded holes in the first plate. By tightening the screws, the flanges 3 of the two rail sections can be clamped between the two plates. The screws are tightened in a manner suitable for sliding of the rail flanges lengthwise between the two plates to accommodate thermal expansion and contraction of the rail. Preferably, the plates are provided with central longitudinal channels that nest together.

The bottom of the rail is provided with parallel slots 8, as shown in FIG. 2, extending lengthwise of it. There are at least two of these slots and usually three or more. The upper sides of the slots are closed by a partition wall 9 that extends across them and forms the lower wall of the tubular portion of the rail. The opposite side walls of each slot 8 are provided directly beneath the partition wall with a pair of opposed grooves 10 extending lengthwise of the rail. Disposed in each of the slots there is a rigid electrical conductor bar 11, the edges of which extend into the grooves to retain the bar in place. The bars are inserted in the grooves from one end of each rail section. Although the bars cannot escape from the grooves, it is preferred to secure them in place, such as by an adhesive, but only at one location for each bar. The bars of the different rail sections are rigidly connected end to end in any suitable manner to form continuous electrical conductors.

The depth of rail slots 8 is such that the exposed lower surfaces of the conductor bars are spaced a considerable distance upwardly from the bottom of the rail. Consequently, there is little danger of something accidentally coming in contact with the recessed conductor bars. On the other hand, the conductor bars are engaged by electric contact members 13 that extend up into the slots. These contact members are part of an electric power pick-up carriage 14 that runs along the rail and that will be described presently.

The plastic from which the rail is made has a high coefficient of thermal expansion; considerably higher than that of the conductor bars that usually are copper. This means that a problem can arise when the rail is subjected to temperature changes of any material extent. The rail sections therefore should be installed with gaps between their ends to allow for expansion on hot days or in plants where they may be subjected to considerable heat. As the rail sections expand, of course the width of the gaps becomes less. When the atmosphere around the rail becomes cooler, the gaps open up wider. These gaps take care of expansion and contraction of the rail, but they create another problem, which is that the power pick-up carriage 14 may not cross wide gaps between the rail sections in a satisfactory manner, or may even become caught in the gap.

To solve this problem the electric pick-up carriage, which includes a channel-like frame 16 that has a bottom wall below the rail and a pair of laterally spaced side walls extending upwardly beside the opposite sides of the rail, has a row of wheels 17 along the inner surface of each side wall rotatably connected to the frame and running in channels 18 along the opposite sides of the upper part of the rail. There are at least four of these wheels in each row so that as the leading wheel crosses an open gap between the ends of adjacent rail sections, there will be at least two wheels in the row still travelling in the rail channel that the leading wheel just left, whereby there will be no tendency for the leading end of the carriage to tilt down as it crosses the gap and possibly becoming stuck in the gap. The carriage will pass smoothly across the gap from one rail section to another.

Figure 3:
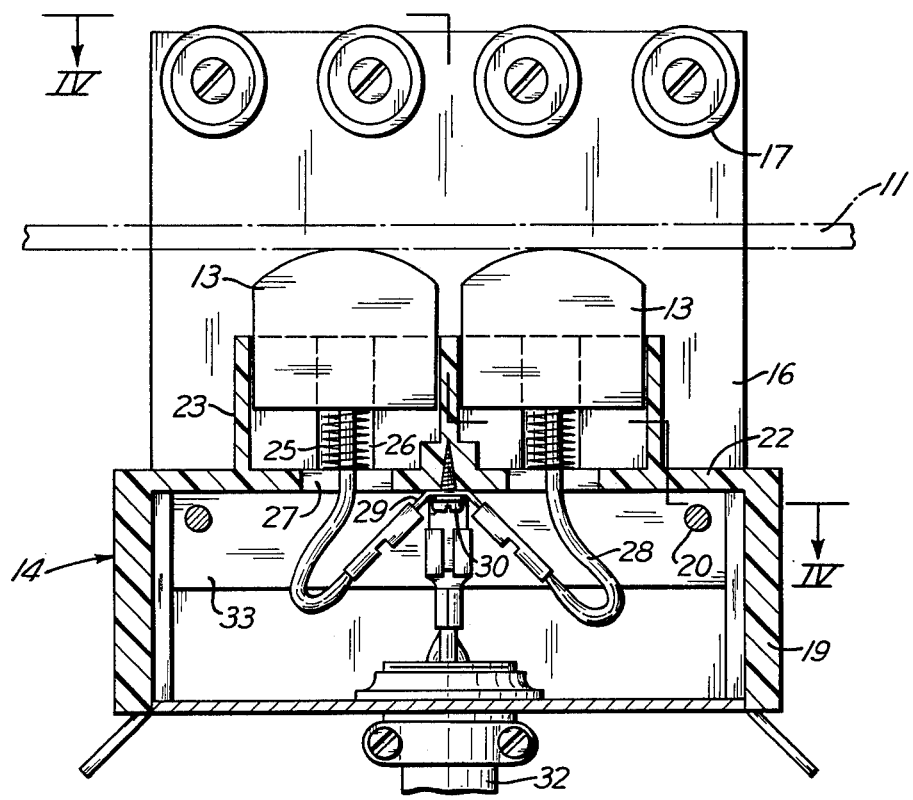
FIG. 3 is a vertical longitudinal section of the carriage taken on the line III—III of FIG. 2.
Figure 4:
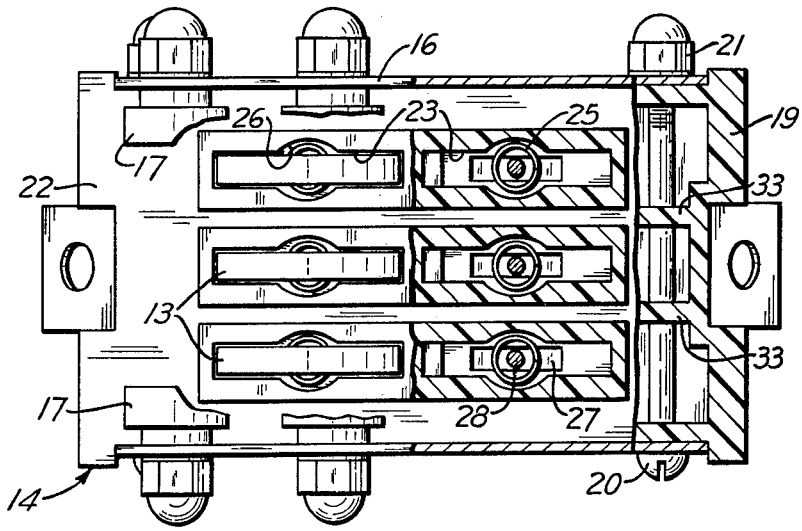
FIG. 4 is a combined plan view and horizontal section taken on the line IV—IV of FIG. 3.

The carriage frame 16 carries an insulating housing 19 beneath the rail. The ends of this housing rest on the bottom wall of the frame and the housing is held in place by screws 20 extending through it and the side walls of the frame. Nuts 21 on the ends of the screws can be removed to permit the housing to be removed from the frame. As shown in FIGS. 3 and 4, it is another feature of this invention that the housing has an upper horizontal wall 22 that forms the bottom of a number of upwardly opening sockets 23. These sockets have side walls extending upwardly from the upper wall of the housing. The side walls of the sockets are spaced apart transversely of the housing as shown in FIGS. 2 and 4. With three conductors 11 in the rail as shown in the drawings, there are three laterally spaced sockets, one below each conductor bar. For best results there is another set of three sockets in line with those just mentioned, making a total of six. Also, it is preferred that the outer configuration of these sockets be rectangular so that their side walls are parallel as well as spaced apart.

Disposed in each of the sockets is one of the electric contact members 13, which most suitable is in the form of a carbon block having a convex upper end for engaging the lower surface of the overlying conductor bar as shown in FIGS. 1 and 3. Each of these contacts is slidable vertically in its socket, in which it is urged upwardly by a coil spring 25 compressed between the bottom of the contact member and the bottom wall of the socket, which is the upper wall 22 of housing 19. If the diameter of the spring is greater than the width of the contact, as it is shown in the drawings, the opposite sides of the socket can be provided with recesses 26 to accommodate the spring. The bottom wall of each socket is provided with a narrow opening 27 which the lower end of the coil spring bridges. Extending through this opening is a flexible wire 28 that also extends up through the spring and has its upper end secured to the bottom of the contact member as shown in FIG. 3. The lower end of the wire is suitably connected to a terminal member 29 attached to the bottom of the upper wall of the housing by means of a screw 30. The same terminal member may be connected to the two wires leading to the two contact members above that terminal. The wires are short enough to prevent the springs from forcing the contact members out of their sockets before the pick-up carriage is applied to the rail. When it is applied to the rail, all of the contacts are pressed down in their sockets and therefore exert pressure against the conductor bars in the rail. The springs maintain this pressure as the contacts wear.

The terminal members 29 are connected to the wires of an electrical conductor 32 that extends up through a central opening in the bottom wall of the carriage frame 16, in which the conductor is clamped. Preferably, all connections to the terminal members are made by quick connectors, such as Spade connectors. This allows the brushes to be quickly replaced when necessary. It also permits conductor 32 to be easily connected to the terminal members after housing 19 has been removed from the carriage frame temporarily to give access to the terminal members. The terminals and wires 28 for each pair of contact members are isolated from the others by vertical partition walls 33 extending lengthwise of the insulating housing. These walls extend downwardly from upper wall 22 of the housing and are located between the different terminals 29, thereby forming separate compartments for the terminals so that there is no danger of arcing between them.

The electric power distribution system disclosed herein can be used for feeding power to any moving or movable object that requires electricity in its operation. Examples are travelling cranes and tools used along assembly lines. The pick-up carriage will move smoothly along the rail even though the expansion gaps in the rail may be rather wide at times. By simply removing screws 20, the insulating housing 19 and the contact members it carries can be removed easily and quickly from the carriage frame for electrically connecting the contact members with the conductor 32 or for replacing the contacts. Due to the fact that sockets 23 are spaced apart laterally and project a considerable distance above the upper wall of the insulating housing, there is no danger of dust and other foreign matter accumulating between the contact members to such an extent as to permit arcing between the contacts.

I claim:

1. In an electric power distribution system, the combination with a hollow overhead rail containing parallel electrical conductors extending lengthwise thereof and having exposed lower surfaces, said rail being formed from a plurality of sections disposed end to end with expansion gaps between the ends of adjacent sections, of an electrical power pick-up carriage comprising a channel-like frame having a bottom wall below said rail and a pair of laterally spaced side walls extending upwardly beside the opposite sides of the rail, a row of at least four wheels along the inner surface of each side wall running on the rail, means rotatably connecting the wheels to said frame to support it from the wheels for smooth travel of said carriage across said gaps from one rail section to another, an insulating housing disposed in said frame below the rail, removable means normally holding said housing in said frame, the upper part of housing having upwardly opening sockets therein, an electric contact member in each of said sockets slidable vertically therein and projecting above the housing into engagement with one of said conductors, springs in the housing urging the contact members upwardly, flexible wires in the housing secured to the contact members and extending downwardly therefrom, terminal means fastening the lower ends of the wires to the housing, the bottom wall of said frame having an opening therethrough for an electrical conductor, and means for fastening such a conductor to said terminal means.

2. In an electric power distribution system, the combination with a hollow overhead rail containing parallel electrical conductors extending lengthwise thereof and having exposed lower surfaces, of an electric power pick-up carriage comprising a channel-like frame having a bottom wall below said rail and a pair of laterally spaced side walls extending upwardly beside the opposite sides of the rail, a row of wheels along the inner surface of each side wall running on the rail, means rotatably connecting the wheels to said frame to support it from the wheels, an insulating housing disposed in said frame below the rail, removable means normally holding said housing in said frame, the upper part of the housing having upwardly opening sockets therein, an electric contact member in each of said sockets slidable vertically therein and projecting above the housing into engagement with one of said conductors, said sockets having bottom walls spaced below said contact members and provided with openings therethrough, coil springs in the sockets compressed between their bottom walls and the bottoms of the contact members for urging the contact members upwardly, the lower end of each spring bridging the bottom wall opening beneath it, flexible wires in the housing secured to the contact members and extending downwardly therefrom through the coil springs and said bottom wall openings, terminal means fastening the lower ends of the wires to the housing, the bottom wall of said frame having an opening therethrough for an electrical conductor, and means for fastening such a conductor to said terminal means.

3. In an electric power distribution system according to claim 1, said terminal means being secured to said housing beneath said sockets.

4. In an electric power distribution system, the combination with a hollow overhead rail containing parallel electrical conductors extending lengthwise thereof and having exposed lower surfaces, of an electrical power pick-up carriage comprising a channel-like frame having a bottom wall below said rail and a pair of laterally spaced side walls extending upwardly beside the opposite sides of the rail, a row of wheels along the inner surface of each side wall running on the rail, means rotatably connecting the wheels to said frame to support it from the wheels, an insulating housing disposed in said frame below the rail, removable means normally holding said housing in said frame, said housing having an upper wall and downwardly extending side and end walls, the top of the housing being provided with upwardly opening sockets having their bottom walls formed from said upper wall, an electric contact member in each of said sockets slidable vertically therein and projecting above the housing into engagement with one of said conductors, springs in said sockets urging the contact members upwardly, the bottom wall of each socket having an opening through it, flexible wires in the sockets secured to the contact members and extending downwardly therefrom through said openings, terminal means fastening the lower ends of wires to the housing beneath said upper wall, the bottom wall of said frame having an opening therethrough for an electrical conductor, and means for fastening such a conductor to said terminal means in said housing.

5. In an electric power distribution system according to claim 4, in which said terminal means are fastened to the bottom of said upper wall, and said housing has a vertical partition wall extending lengthwise thereof and downwardly from said upper wall between adjacent terminal means to form separate compartments for the terminal means.

* * * * *